Figure 1:
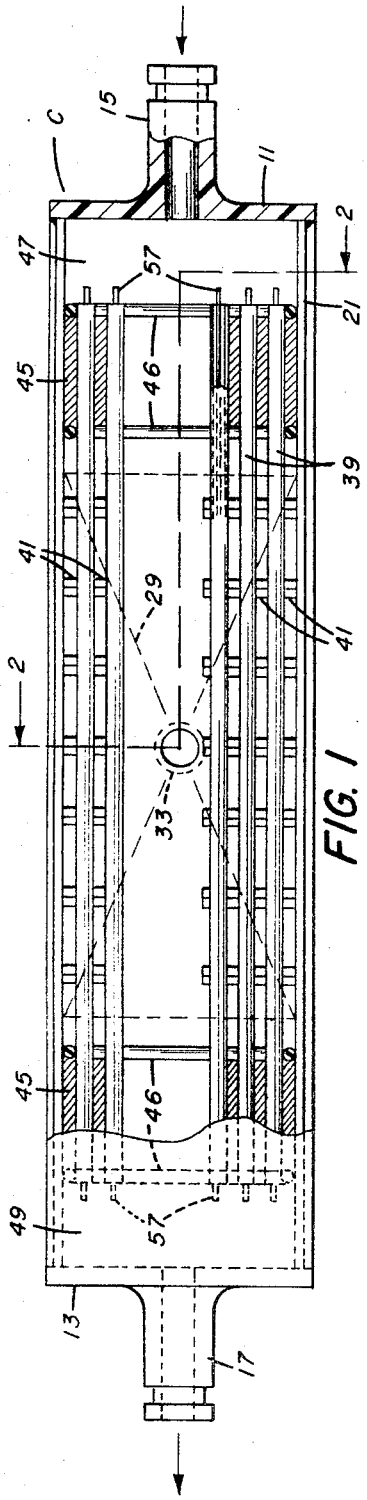
Figure 3:
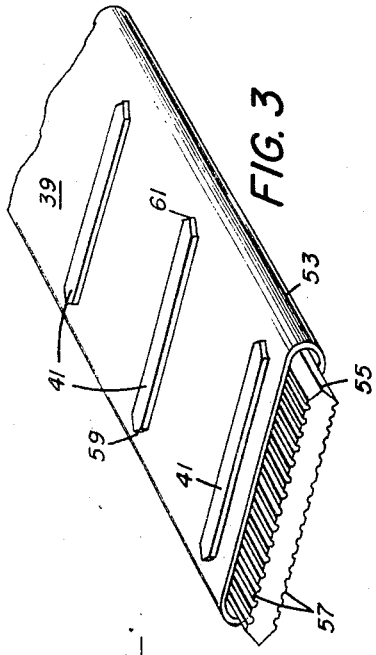
Figure 2:
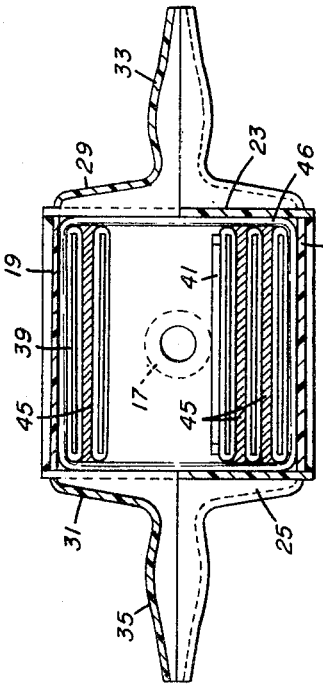

T867005

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 21, 1969

867 O.G. 748

763,804

ARTIFICIAL DIALYZING BODY ORGAN

Lawrence A. Ulmschneider, 1669 Lake Ave., and Charles H. Benton, 755 Ridge Road W., both of Rochester, N.Y. 14650

Filed Sept. 30, 1968. Published Oct. 21, 1969
Int. Cl. B01d *13/00*
U.S. Cl. 210—321
2 Sheets Drawing. 14 Pages Specification

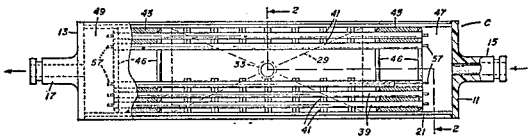

An artificial body organ such as an artificial kidney or lung comprising a casing and flattened tubular dialysis membranes stacked in side-by-side laterally spaced relationship within the casing, providing a flow path for dialyzing fluid through the membranes, and a flow path for blood between the membranes. Each membrane contains a serrated core; and adjacent membranes are spaced apart by transverse strips or by thin sheets having transverse passage for blood flow.

T867005

763804

DEF. PUB.

Oct. 21, 1969 L. A. ULMSCHNEIDER ET AL

ARTIFICIAL DIALYZING BODY ORGAN

Filed Sept. 30, 1968 2 Sheets-Sheet 1

INVENTORS
CHARLES H. BENTON
LAWRENCE A. ULMSCHNEIDER
BY Walter O. Hodsdon
Paul R. Holmes
Henry M. Chapin
ATTORNEYS T869005
Oct. 21, 1969 L. A. ULMSCHNEIDER ET AL 763,804 DEF. PUB.
ARTIFICIAL DIALYZING BODY ORGAN
Filed Sept. 30, 1968 2 Sheets-Sheet 2
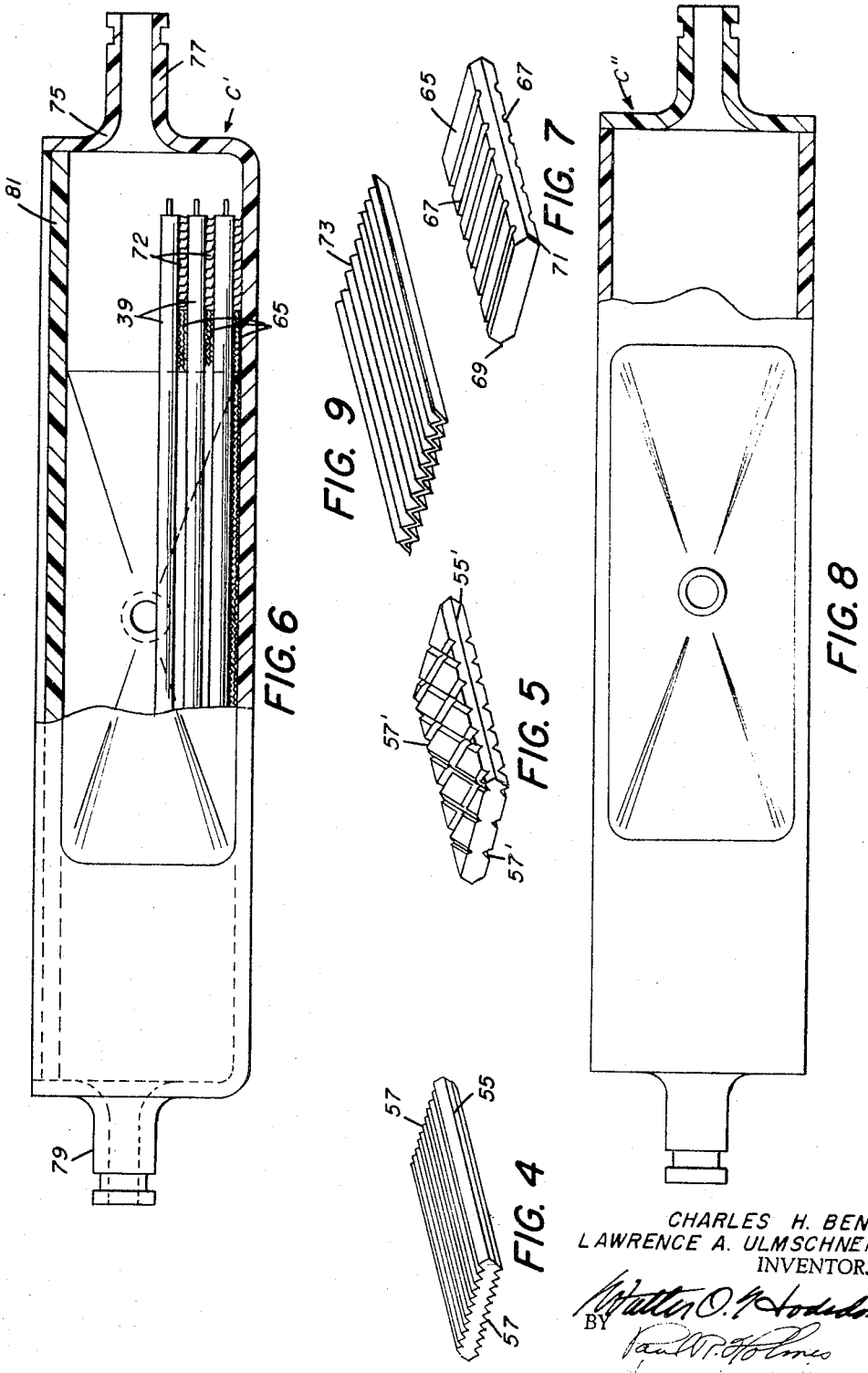
CHARLES H. BENTON
LAWRENCE A. ULMSCHNEIDER
INVENTORS
BY Walter O. Hodsdon
Paul W. Holmes
Henry M. Rapp
ATTORNEYS